United States Patent [19]

Maddaloni

[11] 4,341,364

[45] Jul. 27, 1982

[54] DEVICE FOR DETECTING IRREGULAR OPERATIVE SITUATIONS, PARTICULARLY FOR TAPE DECKS

[75] Inventor: Ciro Maddaloni, Rome, Italy

[73] Assignee: Autovox S.p.A., Rome, Italy

[21] Appl. No.: 131,325

[22] Filed: Mar. 18, 1980

[30] Foreign Application Priority Data

Mar. 20, 1979 [IT] Italy ............................... 48413 A/79

[51] Int. Cl.³ ....................... B65H 59/38; G03B 1/02; G11B 15/13
[52] U.S. Cl. ..................................... 242/191; 242/199
[58] Field of Search ................................. 242/197–200, 242/186, 191; 360/96.5, 96.6

[56] References Cited

U.S. PATENT DOCUMENTS

| 3,730,453 | 5/1973 | Hotchkiss et al. | 242/191 |
| 3,879,756 | 4/1975 | De Bell et al. | 360/74 |
| 4,114,830 | 9/1978 | Hoshi et al. | 242/191 |

Primary Examiner—Leonard D. Christian
Attorney, Agent, or Firm—Ladas & Parry

[57] ABSTRACT

A device for detecting irregular operative situations, particularly for tape decks, serves to detect the rotational state of one of the two discs only. In fact, the rotational state of only one of the two discs carrying the hub for the tape reels implies tape breaking and for this reason the cassette must be ejected or the transport motor must be deenergized. Two motion detectors 11A and 12A, 11B and 12B for the two discs 13A and 13B have as output a logic level 1 if the corresponding disc is stopped while before it rotated or a logic level 0 if the corresponding disc is stopped while before it was stopped; an exclusive OR gate 15 has an inputs the corresponding outputs of two motion detectors, respectively, and the output of exclusive OR gate 15, being 1 when only one of two discs rotates while the other one is stopped, detects an irregular operative situation.

1 Claim, 3 Drawing Figures

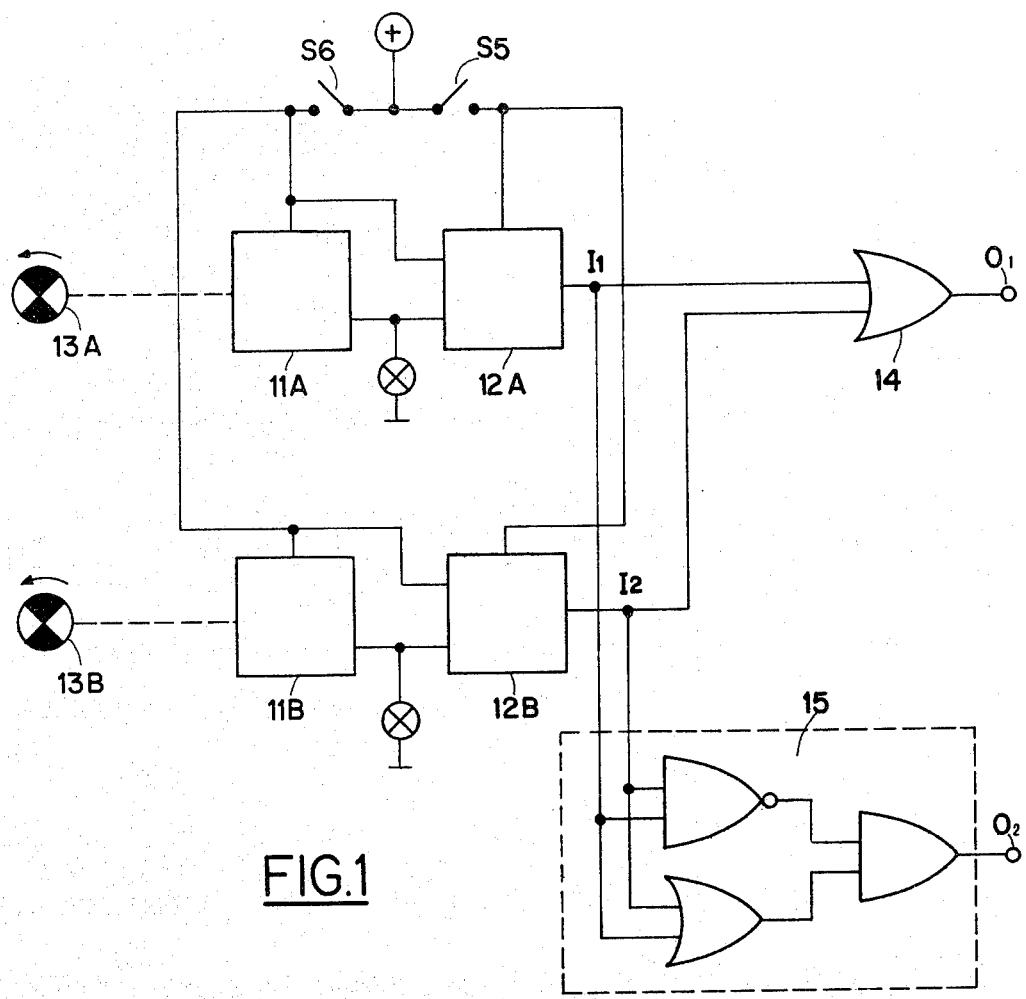

DEVICE FOR DETECTING IRREGULAR OPERATIVE SITUATIONS, PARTICULARLY FOR TAPE DECKS

This invention refers to a device for detecting irregular operative situations, particularly for tape decks.

Devices for detecting the state of motion or rest of magnetic tape are known, which deenergize the motor when the tape stops.

A device of this type is, for instance, described in Italian Pat. No. 849 991, in which rotation of the take-up reel is turned into a series of electric impulses obtained by means of a rotating switch.

Absence or presence of such a train of impulses is processed by particular electronic circuits, the output level of which is 0 or 1, depending on whether the tape is moving or not.

In other devices, for detection of rotation different means are provided, such as for example, the rotating capacitor described in the copending patent application Ser. No. 015,084 of Feb. 26, 1979 assigned to the same assignee now U.S. Pat. No. 4,234,139.

Generally devices for detecting the state of rest or rotation are activated by the disc carrying the hub for the take-up reel.

Such devices, therefore, suffer from the disadvantage of not being able to detect cases of irregular operative situations, such as breaking of the tape before the capstan or during fast forward or fast reverse movement of the tape.

Under these conditions, in fact, the disc carrying the hub for the take-up reel continues to rotate.

In autoreverse type tape decks, there are two motion detecting devices built on both hub carrying discs since both discs may support the delivery or take-off reel or the take-up reel, according to the direction of movement of the tape.

These devices generally operate in parallel or are switched on according to tape direction of movement, so that it is always the take-up reel disc which is connected to the logic circuit, the output of which is then processed to obtain either reversing of the tape movement direction at each tape stop, or direction reversing when the tape stops a first time and ejection of the cassette when the tape stops a second time.

In particular, in the copending patent application Ser. No. 039,408 of May 15, 1979 assigned to the same assignee, an electronic circuit for the control of reverse type tape decks is described, which allows to totally eliminate the mechanical controls required for reversal of the tape direction.

However, some disadvantages have been found in using such a circuit.

It may be in fact observed that, with reference to the electronic circuit described in the above patent application Ser. No. 039,408, in the case in which the function selector, there indicated by S1, is in the "continuous program" position, braking of the tape causes no reaction, while stopping of the take-up reel causes continuous reversing-of-direction operations. In the case where function selector S1 is in the "single program" position, braking of the tape causes no reaction.

In the case where selector switch S1 is in the "automatic reversal" position, braking of the tape has no consequence, while stopping of the receiving reel first causes a reversal and then an ejection.

It is the main object of this invention to avoid the disadvantages described above by eliminating irregular operative situations through simultaneous processing of the two trains of impulses coming from both hub carrying discs in the tape deck, according to the following logic:

if both discs rotate, continuation of tape transport movement is allowed;

if both discs are resting, ejection of the cassette or reversal of the direction of the tape transport movement takes place, depending on which is required;

if one of the two discs is resting, while the other one is moving, an irregular operative situation is detected and ejection of the cassette takes place.

A device for detecting irregular operative situations, in particular for tape decks, according to this invention, is characterized in that it comprises:

two motion detectors for the two discs, respectively, having a logic level 1 output if the respective disc is stopped, while before it rotated, or a logic level 0 output if the respective disc is stopped while before it was stopped; and an exclusive OR gate, having as inputs the outputs of the two motion detectors respectively, the output of which exclusive OR gate, being 1 only when one of the two discs is rotating while the other is stopped, detects an irregular operative situation.

One embodiment of the device in accordance with the invention will now be described by way of example, not in any limiting sense, with reference to the accompanying drawing in which:

FIG. 1 is a block diagram of the device according to the invention; and

FIGS. 2a and 2b are truth tables for the device.

Referring initially to FIG. 1 of the drawing, the device according to the invention comprises two detectors 11A and 12A, 11B and 12B of motion of hub carrying discs 13A and 13B.

The motion detectors are of a known type and may be, for instance, those described in the cited patent application Ser. No. 039,408 of the same assignee.

Such motion detectors show a logic level 1 output if the respective hub carrying disc is stopped while before it rotated, or a logic level 0 output if the respective hub carrying disc is stopped while before it was stopped.

The outputs $I_1$, $I_2$ of the two motion detectors are connected to corresponding inputs of an OR gate 14, the output $O_1$ of which is at logic level 0 when both discs rotate, otherwise it is at logic level 1.

Outputs $I_1$ and $I_2$ of the two motion detectors are also connected to the inputs of an exclusive OR gate 15, the output $O_2$ of which is at logic level 0, if the hub carrying discs are both rotating or are both stopped, and is at logic level 1 if one of the two hub carrying discs is stopped.

The logic circuit having inputs $I_1$, $I_2$ and outputs $O_1$ and $O_2$, performs the logic functions indicated in the truth tables of FIGS. 2a and 2b and therefore the following diagram results for the outputs:

output $O_1$ is at logic level 0 if both hub carrying discs are rotating;

output $O_1$ is at logic level 1 if one of the two hub carrying discs is stopped, as well as if both discs are stopped;

output $O_2$ is at logic level 0 if the two hub carrying discs are both stopped or are both rotating, which denotes normal operation of tape deck;

output $O_2$ is at logic level 1 if one disc is stopped and the other is rotating, which denotes an irregular operative situation caused by breaking of the tape.

Output $O_1$ is connected to the usual circuits for reversing the tape direction of movement or for ejecting the cassette.

Output $O_2$ is used to ensure that, whenever one of the two discs stops while the other continues to rotate, in other words whenever an irregular operative situation occurs, the cassette is ejected.

With reference to the electronic circuit described in the cited patent application Ser. No. 039,408 of the same assignee, output $O_1$ is connected to the usual circuits controlling reversal or ejection, programmed through switch S1, while output $O_2$ is used either to force the function selector into the "single program" position, no matter what program is selected, so that the control impulse from output $O_1$ may always produce an ejection if one of the two discs stops while the other continues to rotate, in other words every time an irregular operative situation occurs, or to directly produce ejection of the cassette.

In operation, if the tape in the cassette is pulled normally in one of the two playing directions, the outputs of the two blocks 12A and 12B are 0, therefore the exclusive OR gate 15 output is 0, and this causes no effect, thus denoting normal operation; under this condition output of OR gate 14 is 0 and the tape is regularly pulled according to the preset program (in example "continuous program", or "single program", or "automatic reversal"). When the tape stops, outputs $I_1$ and $I_2$, of 12A and 12B respectively, go to 1 and therefore output of OR gate 14 is 1 and, since the output of gate 15 stays at 0, the transition is processed by the circuit so as to cause a reversal in the case of "continuous program", or an ejection in the case of "single program", or a reversal followed at the next stop by an ejection in the case of "automatic reversal".

If, instead, one of the previously described irregular tape pulling situations occurs, only one of the discs will stop and therefore, in addition to the transition from 0 to 1 of the output of OR gate 14, a transition from 0 to 1 of the output of gate 15 will also occur, which will interdict a tape deck motor driving transistor and will deenergize the holding relay, thus ejecting the cassette.

It is obvious that various changes may be applied by those skilled in the art to this embodiment of the invention hereinbefore described, without departing from the spirit thereof; it is understood that all such changes fall within the scope of the invention.

What is claimed is:

1. In a cassette tape deck including: a pair of hub-carrying discs, a pair of motion detectors, respectively, associated with said discs and consisting of logic elements the output of which show a logic level 1 output if the hub-carrying discs associated thereto change their state of movement from rotation to stopped, or a logic level 0 output if the associated hub-carrying disc changes its state of movement from stopped to rotation; first electric circuits controlling reversal of tape direction, and second electric circuits controlling ejection of a cassette, the improvement of a device for detection of irregular operating situations of the tape comprising: a first OR gate having two inputs and an output, said first gate inputs being connected to receive the two outputs of said motion detectors, and the output of said first gate being connected to said first and second electric circuits; a second exclusive OR gate having the two inputs and an output, said second gate inputs being corrected to receive the two outputs of said motion detectors, and the output of said second gate being connected to said second electric circuit whereby the output of said first gate is at logic level 1 only when one of said discs is rotating and the other of said discs is stopped and is a logic level 0 when both of said discs are rotating; and the output of said second gate is at logic level 0 if both of said discs are either rotating or stopped and switches to a logic level 1 if one of said discs is stopped whereby should either one of said discs stop due to any irregularities in operation of the tape deck a cassette is automatically ejected.

* * * * *